No. 854,063. PATENTED MAY 21, 1907.
J. THOMSON & F. W. KREMER.
WHEEL.
APPLICATION FILED MAY 14, 1906.

3 SHEETS—SHEET 1.

Witnesses:
Chas. D. King.
Ella J. Kruger.

Inventors:
John Thomson and
Franklin W. Kremer
by Redding, Kiddle & Greeley
Attys.

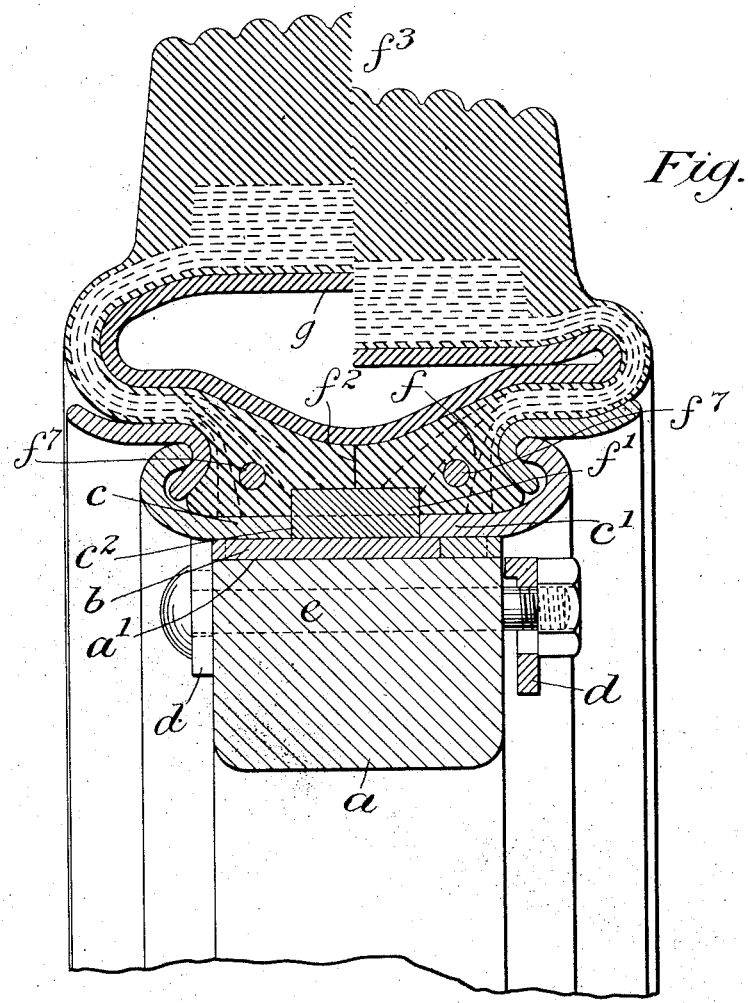

No. 854,063. PATENTED MAY 21, 1907.
J. THOMSON & F. W. KREMER.
WHEEL.
APPLICATION FILED MAY 14, 1906.
3 SHEETS—SHEET 3.
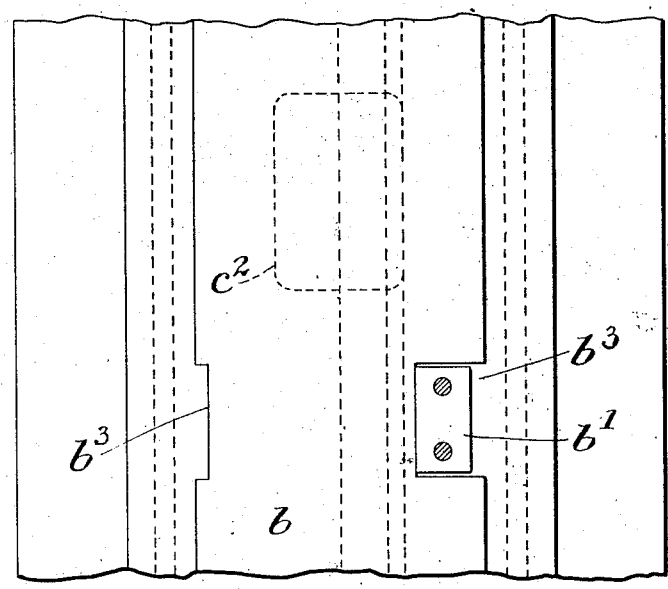
Fig. 3
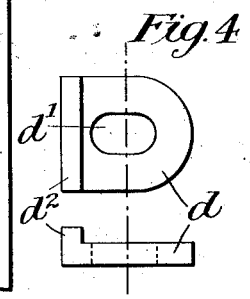
Fig. 4
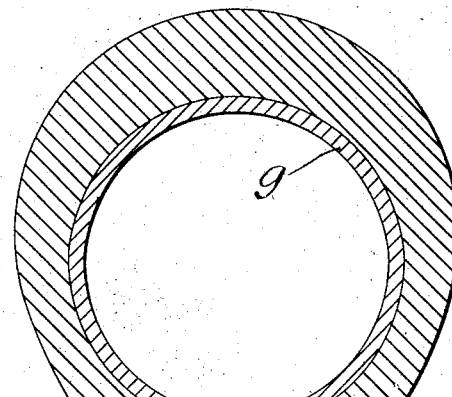
Fig. 6
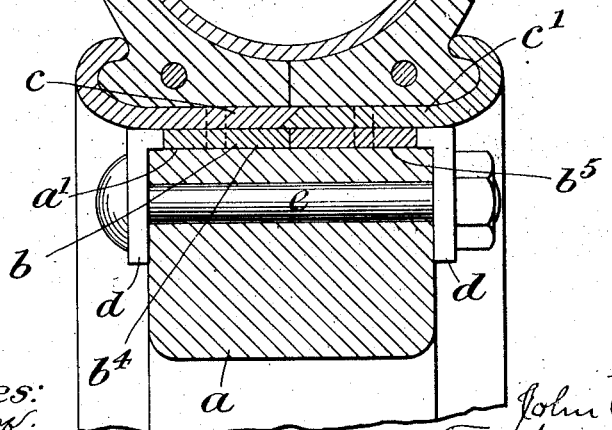
Witnesses:
Chas. D. King
Ella J. Kruger
Inventors
John Thomson
Franklin W. Kremer
by Redding, Kiddle & Greeley Attys.

UNITED STATES PATENT OFFICE.

JOHN THOMSON AND FRANKLIN W. KREMER, OF NEW YORK, N. Y., ASSIGNORS TO TRIDENT TIRE COMPANY, OF NEW YORK, N. Y., A CORPORATION OF NEW YORK.

WHEEL.

No. 854,063.   Specification of Letters Patent.   Patented May 21, 1907.

Application filed May 14, 1906. Serial No. 316,694.

*To all whom it may concern:*

Be it known that we, JOHN THOMSON and FRANKLIN W. KREMER, both citizens of the United States, residing in the borough of Manhattan, of the city of New York, State of New York, have invented certain new and useful Improvements in Wheels, of which the following is a specification, reference being had to the accompanying drawings, forming a part hereof.

This invention relates to cushion tired wheels in which the cushion effect is derived chiefly from pneumatic tires, and in which the tires are of the so-called "clencher" variety.

In the application of ordinary clencher tires to wheels, it is usually with great difficulty that the tires, even when deflated, are stretched and pulled over the flanges of the clencher rims. Furthermore, if such tires can be stretched sufficiently by hand to permit of their application to the ordinary clencher rims, they are more liable to be unseated when the side thrust of the vehicle is unusually severe, particularly if the tire is punctured and deflates, as frequently happens in the use of automobiles equipped with such tires. Furthermore, when such tires have been in use for a considerable time and the rubber has become more or less set, it is very difficult to remove such tires by hand for the purpose of repair when necessary.

The object of the present invention is to overcome the difficulties above referred to as incident to the use of clencher tires, and to provide an improved structure in which the liability to such defects as have been mentioned shall be eliminated altogether or reduced to a minimum.

Figure 1:
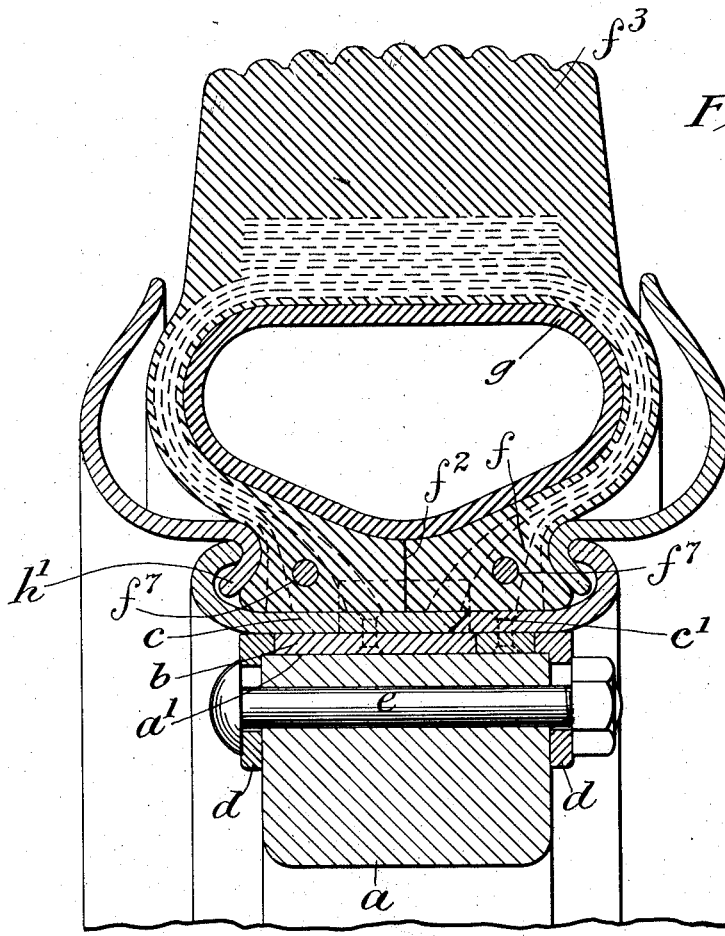
Figure 5:
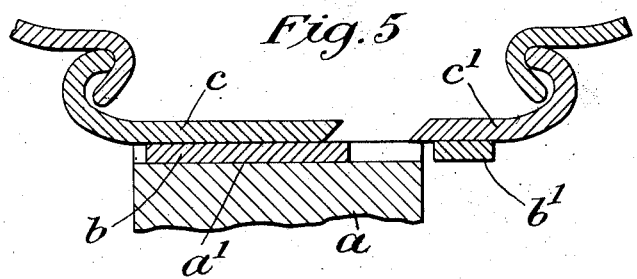

The invention will be more fully explained hereinafter with reference to the accompanying drawings in which it is illustrated as embodied in a convenient and practical form, and in which, Figure 1 is a detail view in section of the circumferential portion of a wheel, with its tire, to which the present improvements are applied. Fig. 2 is a similar view, but showing the tire on the left of the median line partially deformed and on the right of the line deformed to a maximum extent. Fig. 3 is an inner face view of the divided clencher ring and tire. Fig. 4 is a detail view in side and front elevation of one of the locking latches. Fig. 5 is a detail view, in section, showing the clencher ring with its members separated and the thrust plates, the latter being broken off to save space. Fig. 6 is a view generally similar to Fig. 1, but illustrating the application of the securing devices to a tire of ordinary form.

The body of the wheel is sufficiently represented in the drawings by the felly $a$, which has the usual flat face $a'$. A clencher ring composed of two circumferential members $c$ and $c'$, but otherwise of ordinary form, is applied to the felly, one of its members, as $c$, being preferably riveted to a band $b$. To the other member, $c'$, are secured lugs or bosses $b'$ to engage recesses or notches $b^3$ in the band $b$. The meeting edges of the two members $c$ and $c'$ of the clencher ring are preferably beveled correspondingly, the better to prevent the rubber of the tire from flowing between them when the wheel is in use. The beveling of the edge of the member $c'$ also facilitates the introduction of the same beneath the tire when the latter is in position.

Clips $d$, held to the sides of the felly by bolts $e$, engage the slots or recesses $b^3$, in the opposite edges of the band $b$, to prevent creeping, and also by impingement against the edge of the band on one side, and the lugs $b'$ on the other, act, when the bolts are set up, to press the sections of the clencher ring together to clamp the tire. The latches or clips have elongated holes $d'$ with inwardly projecting lips $d^2$ to lie upon the face of the felly. By loosening the bolts $e$ sufficiently the clips can be pulled outwardly and slipped down so as to release the clencher ring, or the clencher ring and the band, as the case may be, while if the bolts are loosened slightly during use the lips still retain the clips in position to retain the clencher ring and the band against circumferential creeping. Furthermore, slots or recesses are formed in the clencher ring member $c$, as at $c^2$, for engagement with bosses $f'$ formed on or secured to the inner face of the tire shoe $f$, so that the creeping of the tire circumferentially upon the clencher ring is prevented, and the use of the ordinary clenching clamps is avoided.

The tire may be of any suitable construction but is preferably formed as shown, comprising a shoe or outer tire which is divided longitudinally on its inner face, as at $f^2$, to permit the introduction of the inner tube and is provided with a heavy tread portion $f^3$. The inner portions of the shoe or outer tire may be provided with inextensible wires $f^7$, if desired, as no stretching of the tire is necessary to enable it to be applied, as will be explained hereinafter. The inner or pneumatic tube $g$ is formed as usual and conforms to the cavity within the outer tube.

In Fig. 6 the band $b$ is shown as consisting of two circumferential sections riveted to the respective sections of the clencher ring. This figure also shows how readily an ordinary clencher tire can be secured to a wheel by the use the divided clencher ring, the thrust plates being omitted. In this construction, as well as in that shown in Fig. 1, the convenience secured in application and removal of a tire is clearly exhibited. In applying the tire, the band $b$, or the section $b^4$ thereof, is placed on the wheel with the section $c$ of the clencher ring. The tire is then slipped into place and the section $c'$ of the clencher ring is applied, together with the section $b^5$ of the band $b$ if the construction is as shown in Fig. 6. The clips $d$ being then slipped into place, the bolts $e$ are set up and the tire is securely clamped in place. If it is desired to remove the tire the operations described are reversed.

Clearly the clips $d$ at the left hand edge of the felly might be omitted if desired and the section $c$ of the clencher ring and the band $b$ be secured directly and permanently to the felly.

It will be understood that various changes in details of construction and arrangement may be made to suit different conditions of use without departing from the spirit of the invention.

We claim as our invention—

1. The combination with a wheel and a clencher tire, of a band applied to the body of the wheel with notches in its edge and a clencher ring formed of two circumferential members, one member being secured to the band, and the other member having lugs to enter the notches, clips to engage the notches in the band and to impinge upon the lugs, and means to secure the clips to the body of the wheel.

2. The combination with a wheel and a clencher tire, of a band applied to the body of the wheel with notches in its edge, a clencher ring formed of two circumferential members, one member secured to the band, and the other member having lugs to engage the notches, clips having lips to engage the notches in the band and to impinge upon the lugs and having elongated holes, and bolts passed through the holes in the clips on opposite sides of the wheel and through the felly of the wheel.

3. The combination with a wheel and a clencher tire of a band applied to the body of the wheel and notched on its edge, clips secured to the body of the wheel and engaging the notches in the band, a clencher ring formed of two circumferential members and co-operating lugs and recesses on the tire and the ring.

This specification signed and witnessed this 8th day of May, A. D., 1906.

JOHN THOMSON.
FRANKLIN W. KREMER.

Signed in the presence of—
HIRAM C. CROSS,
WALTER C. BURKE.